United States Patent
Kitano et al.

[11] Patent Number: 5,577,096
[45] Date of Patent: Nov. 19, 1996

[54] TRANSMISSION SYSTEM HAVING STAND-BY LINE SWITCHING FACILITY

[75] Inventors: Kouichi Kitano, Fukuoka; Atsuhiko Utsumi, Kawasaki, both of Japan

[73] Assignee: Fujitsu Limited, Kanagawa, Japan

[21] Appl. No.: 18,750

[22] Filed: Feb. 17, 1993

[30] Foreign Application Priority Data

Feb. 17, 1992 [JP] Japan ................... 4-029777

[51] Int. Cl.⁶ ............... H04M 1/24; H04M 3/08; H04M 3/22
[52] U.S. Cl. ............... 379/2; 379/1; 379/12; 379/15; 379/22; 379/25; 379/26
[58] Field of Search ............... 379/1, 2, 12, 15, 379/22, 25, 26; 370/16, 13

[56] References Cited

U.S. PATENT DOCUMENTS

| | | | |
|---|---|---|---|
| 4,365,248 | 12/1982 | Bargeton | 370/16 |
| 4,442,518 | 4/1984 | Morimoto | 379/2 |
| 4,451,708 | 5/1984 | Kemler | 379/2 |
| 4,462,058 | 7/1984 | Ziegler | 379/2 |
| 4,680,776 | 7/1987 | Ikeuchi et al. | 370/16 |
| 4,829,512 | 5/1989 | Nakai et al. | 370/16 |
| 4,831,617 | 5/1989 | Iwasaki | 370/13 |
| 4,878,048 | 10/1989 | Gottesman et al. | 379/27 |
| 4,996,702 | 2/1991 | Gray | 379/1 |
| 5,001,741 | 3/1991 | Sayer | 379/15 |
| 5,073,774 | 12/1991 | Ikawa | 379/2 |

FOREIGN PATENT DOCUMENTS

| | | |
|---|---|---|
| 55-67252 | 5/1980 | Japan . |
| 62-216431 | 9/1987 | Japan . |

Primary Examiner—Wellington Chin
Assistant Examiner—Vijay Shankar

[57] ABSTRACT

A transmission system provides a stand-by line switching facility. The transmission system includes a plurality of working line side processing equipments and a stand-by line side processing equipment to replace one of the working line side processing equipments if a fault occurs therein. The transmission system has a first unit and second unit disposed for each working line side processing equipment. The first unit issues, upon receipt of a line switching command, a single line switching control signal. The second units commonly receive the single line switching control signal and respective line switching is performed between the faulty working line and the stand-by line simultaneously.

10 Claims, 14 Drawing Sheets

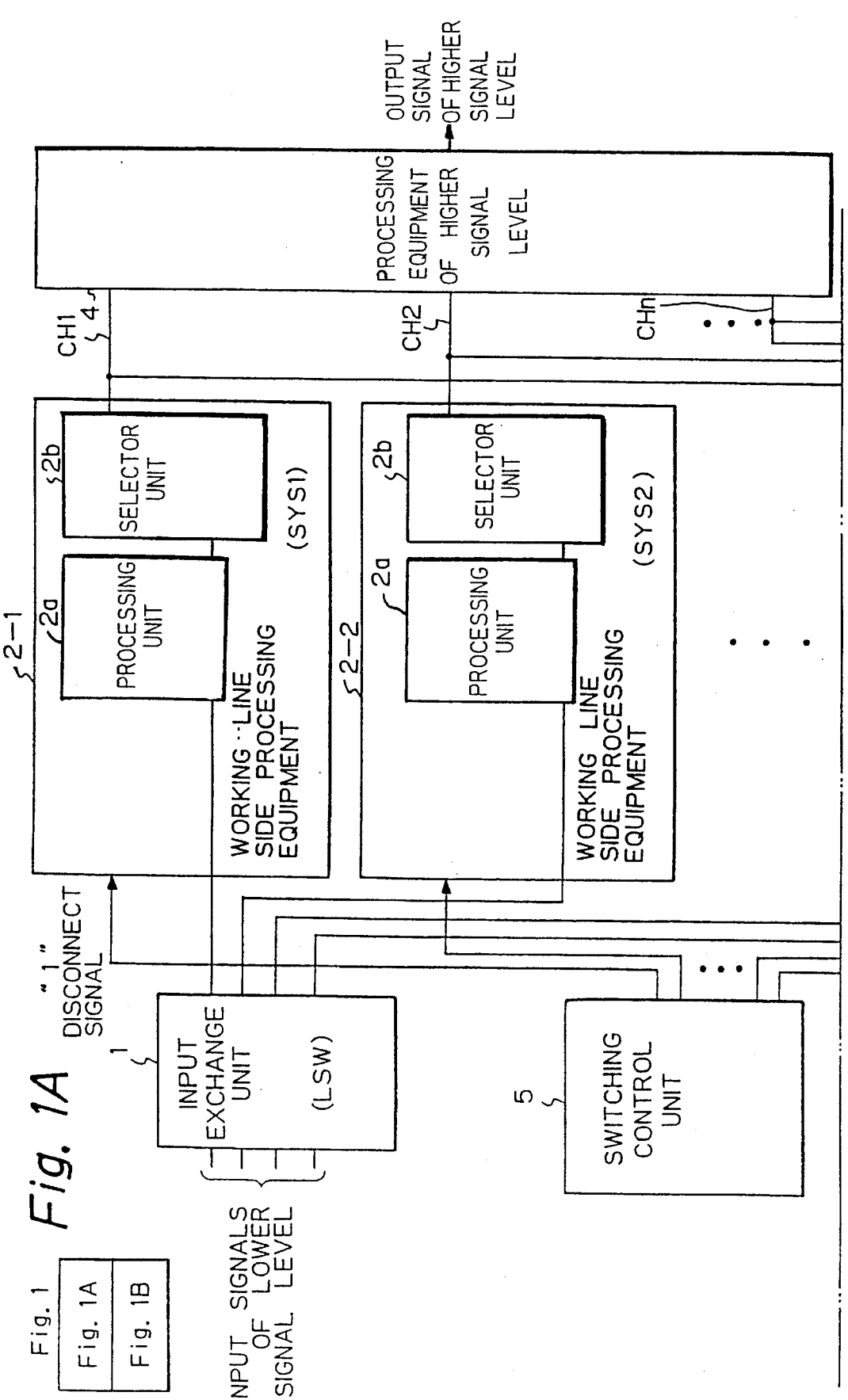

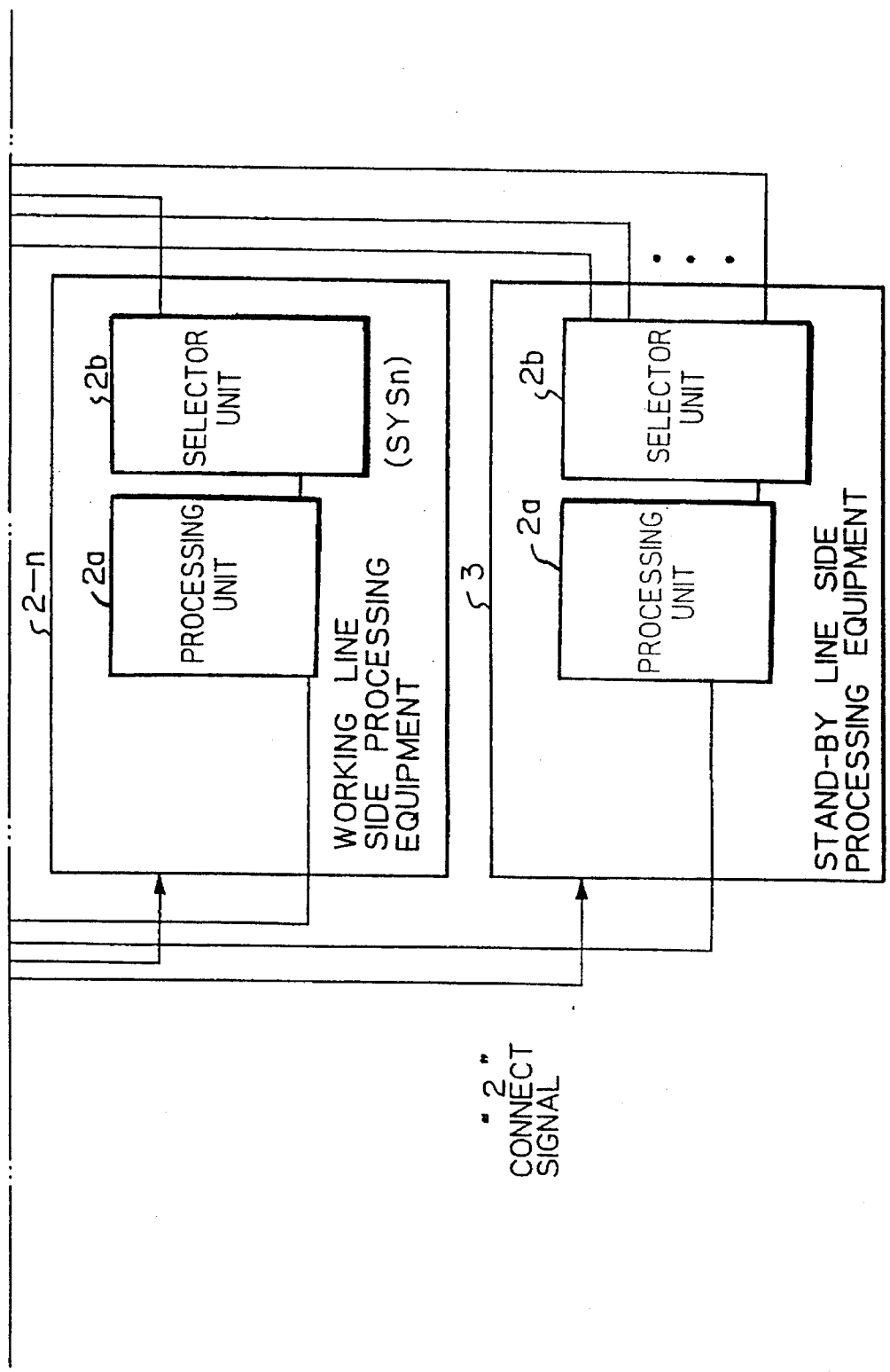

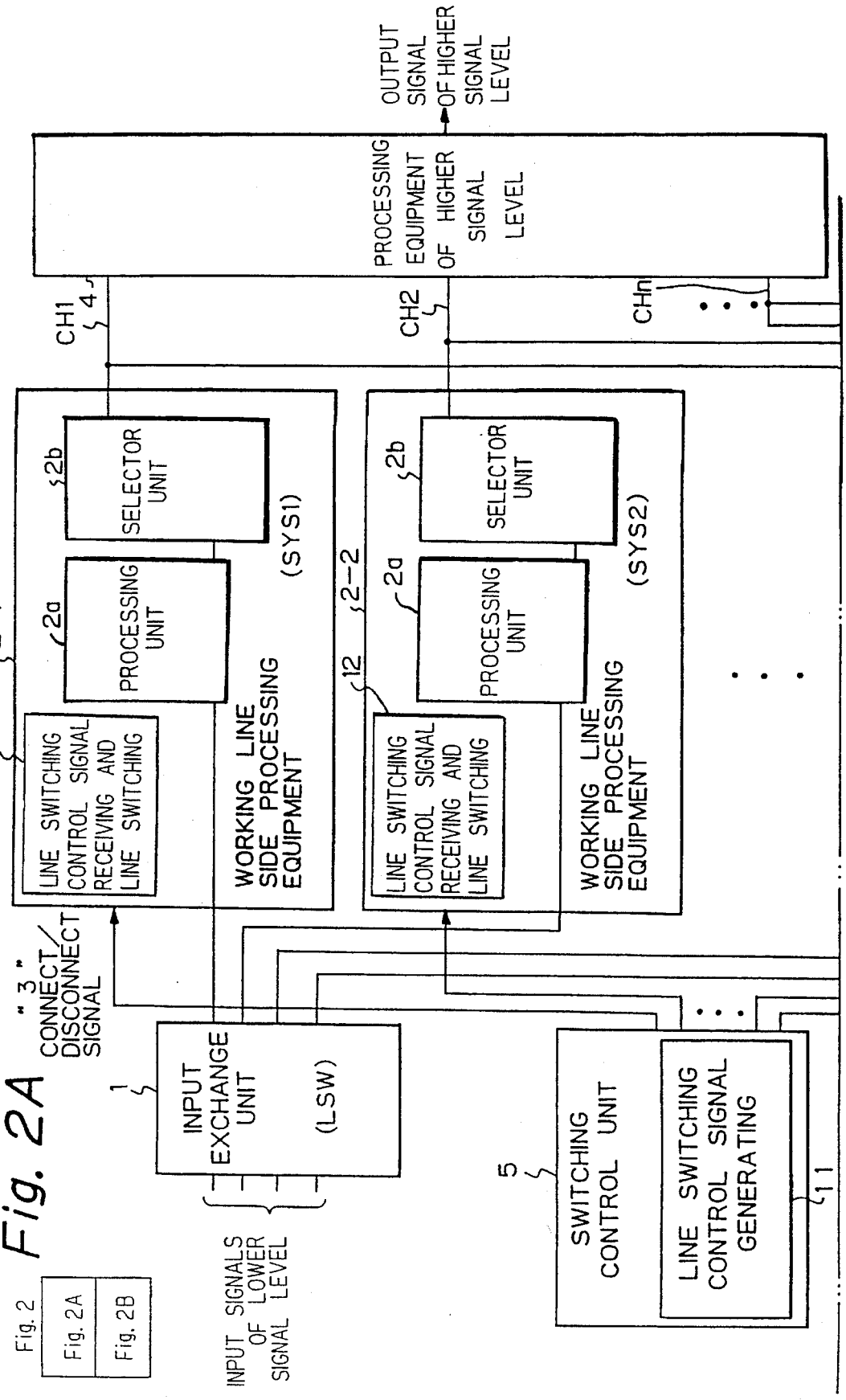

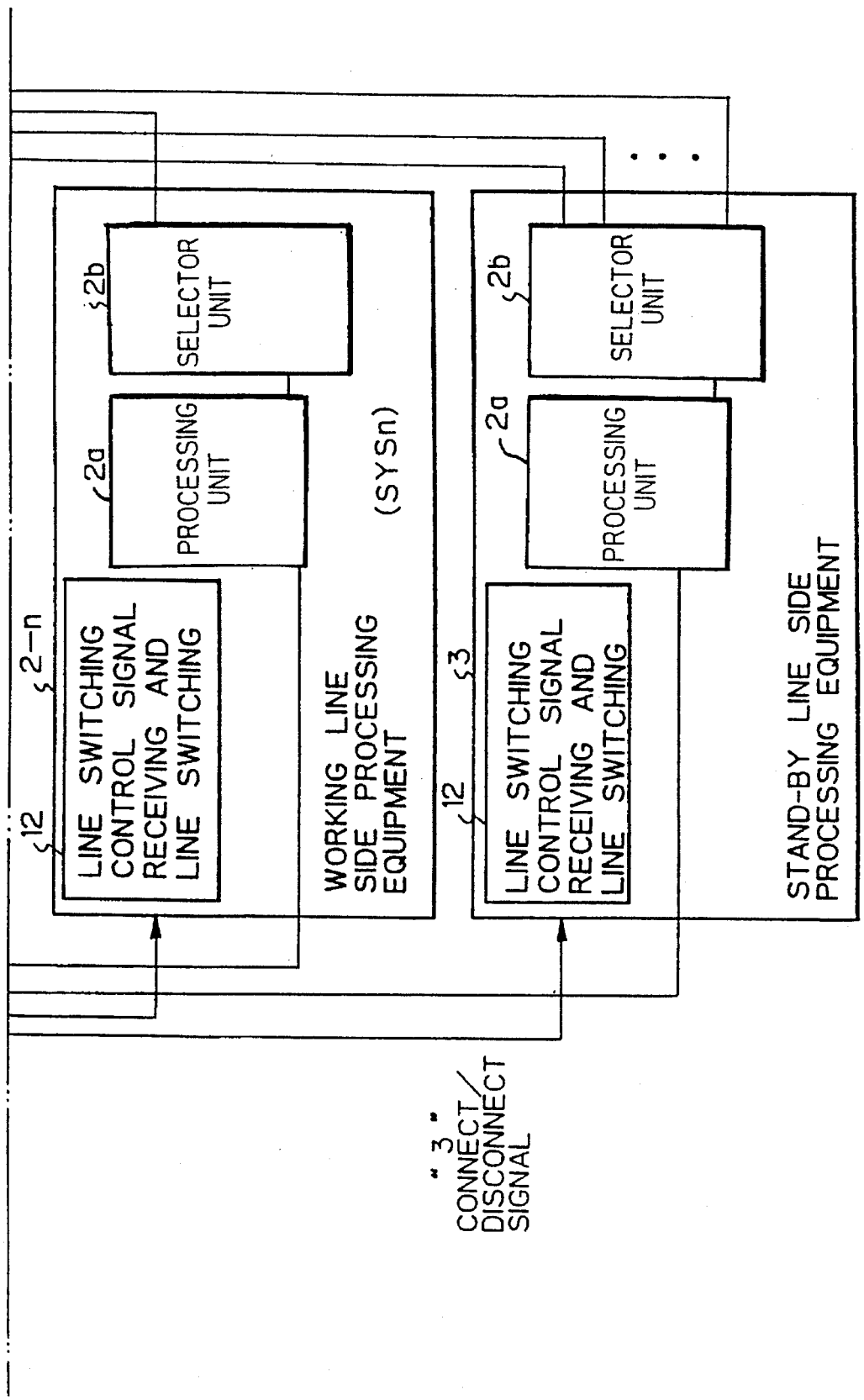

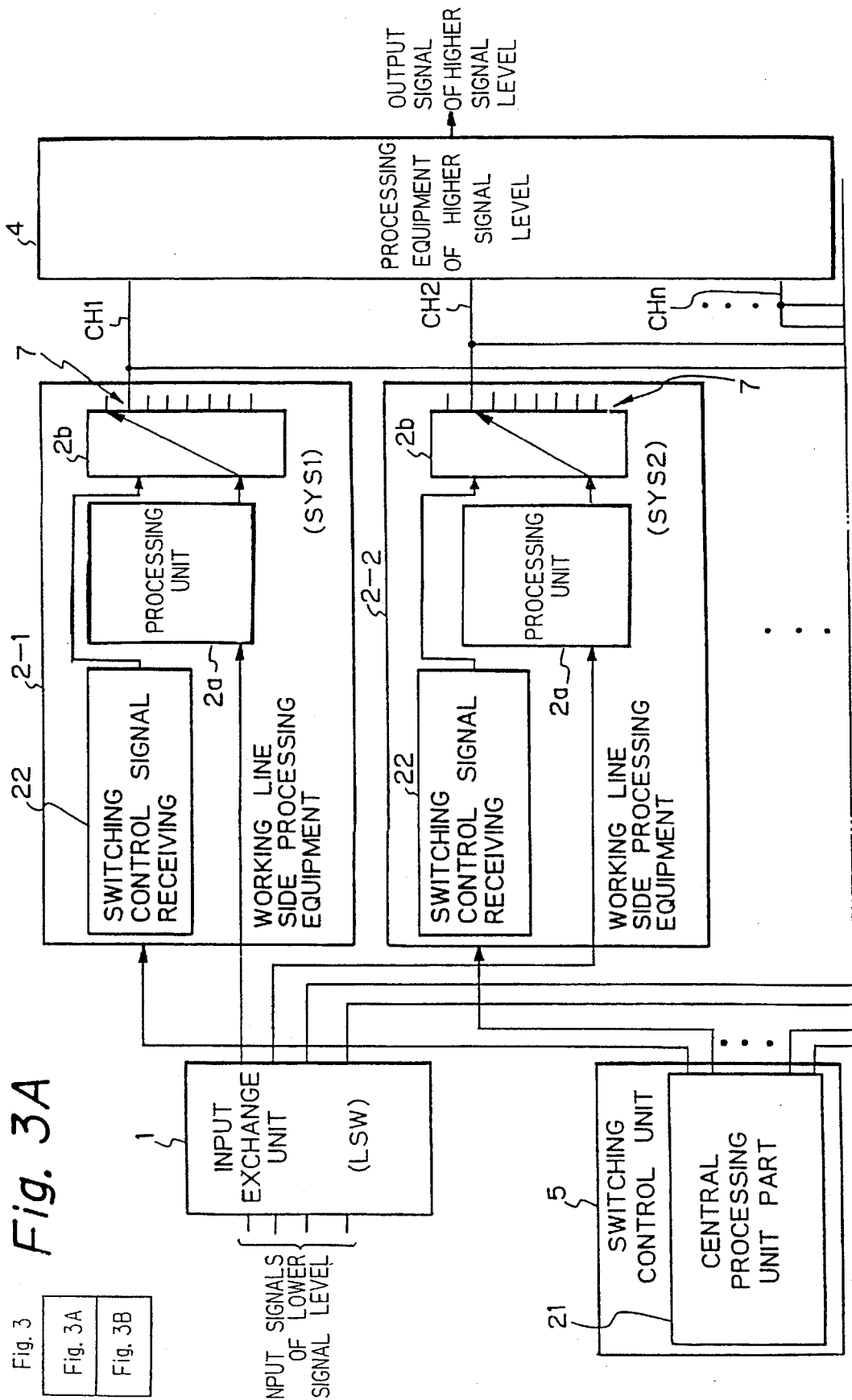

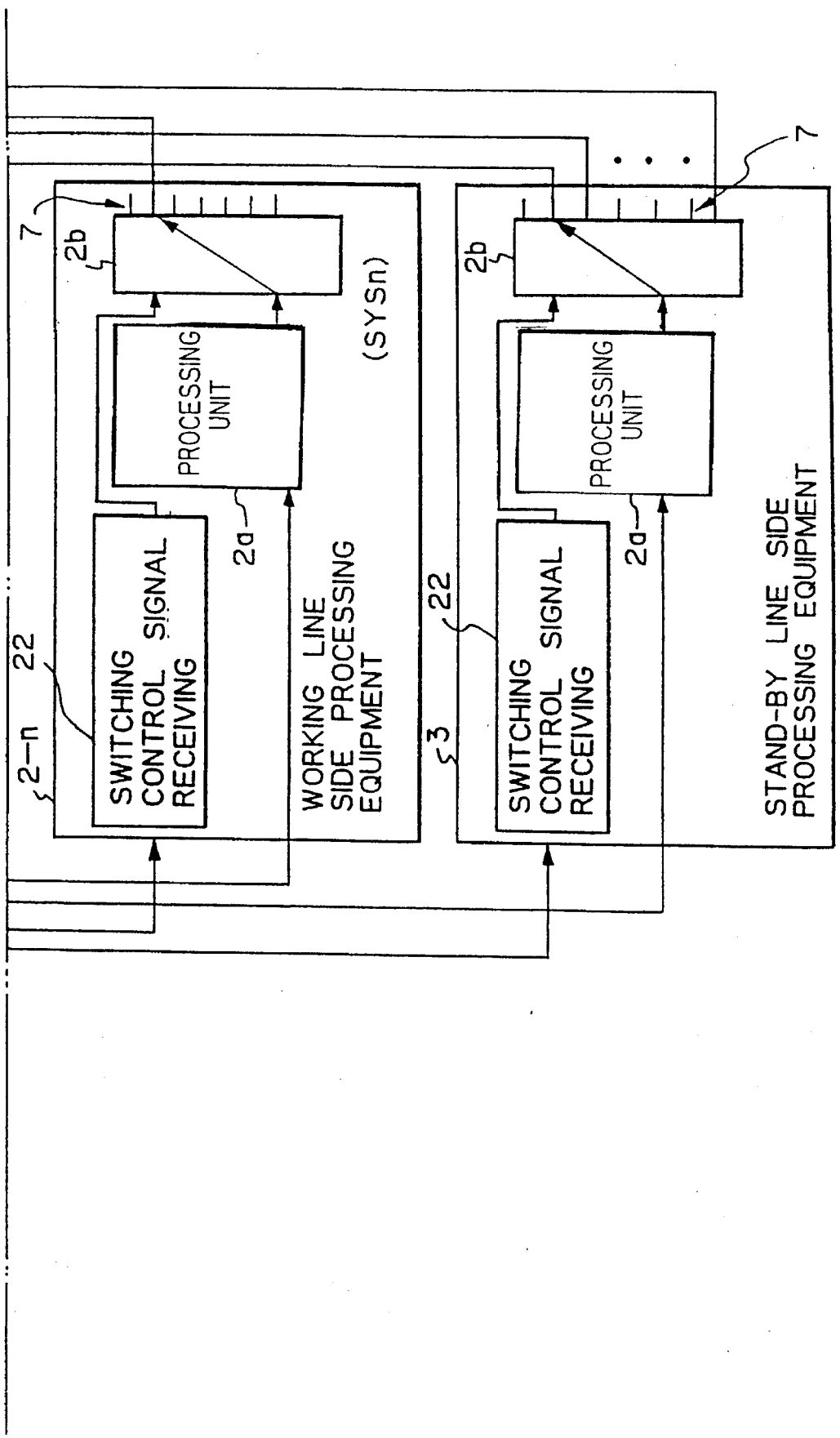

Fig. 7

| CONTROL BITS | | | | STAND-BY LINE SIDE PROCESSING EQUIPMENT | | | | | WORKING LINE SIDE PROCESSING EQUIPMENT | | | | | |
|---|---|---|---|---|---|---|---|---|---|---|---|---|---|---|
| D3 | D2 | D1 | D0 | W/S | EN | ⟨3⟩ | ⟨2⟩ | ⟨1⟩ | Ss | W/S | EN | ⟨3⟩ | ⟨2⟩ | ⟨1⟩ | Ss |
| 0 | 0 | 0 | 1 | 1 | 1 | 0 | 0 | 1 | SELECT 1 | 0 | 0 | 0 | 0 | 0 | STAND BY |
| 0 | 0 | 1 | 0 | 1 | 1 | 0 | 1 | 0 | SELECT 2 | 0 | 0 | 0 | 0 | 0 | STAND BY |
| 0 | 0 | 1 | 1 | 1 | 1 | 0 | 1 | 1 | SELECT 3 | 0 | 0 | 0 | 0 | 0 | STAND BY |
| 0 | 1 | 0 | 0 | 1 | 1 | 1 | 0 | 0 | SELECT 4 | 0 | 0 | 0 | 0 | 0 | STAND BY |
| 0 | 1 | 0 | 1 | 1 | 1 | 1 | 0 | 1 | SELECT 5 | 0 | 0 | 0 | 0 | 0 | STAND BY |
| 0 | 1 | 1 | 0 | 1 | 1 | 1 | 1 | 0 | SELECT 6 | 0 | 0 | 0 | 0 | 0 | STAND BY |
| 0 | 1 | 1 | 1 | 1 | 1 | 1 | 1 | 1 | SELECT 7 | 0 | 0 | 0 | 0 | 0 | STAND BY |
| 1 | 0 | 0 | 1 | 1 | 0 | 0 | 0 | 0 | STAND BY | 0 | 1 | 0 | 0 | 1 | SELECT 1 |

TRANSMISSION SYSTEM HAVING STAND-BY LINE SWITCHING FACILITY

BACKGROUND OF THE INVENTION

1. Field of the Invention

The present invention relates to a transmission system having a stand-by line switching facility, the system including therein a plurality of working lines for transferring respective information signals, a stand-by line for replacing a faulty working line and a stand-by line switching apparatus for carrying out the switching between the faulty working line and the stand-by line.

2. Description of the Related Art

A redundant system is usually incorporated in a transmission system so as to increase communication reliability of the transmission system. Namely, if a fault occurs in one of working lines, the faulty working line is bypassed by the redundant system which forms, in usual operation, a stand-by line.

As will be explained hereinafter, the switching from the faulty working line to the stand-by line and vice versa is handled by a switching control unit including therein a central processing unit (CPU). The CPU detects a fault that has occurred in the transmission system and then achieves the switching between the working line and the stand-by line.

In this case, when a fault occurs in the transmission system, the CPU detects the fault and then issues a command to disconnect the faulty working line at a first step. At a second step, the CPU issues another command to connect the stand-by line to the faulty working line to replace the same.

Thus, in the prior art switching operation, at least two commands are to be issued from the CPU. This apparently causes a switching delay, and therefore, rapid switching cannot be expected.

SUMMARY OF THE INVENTION

Therefore, it is an object of the present invention to provide a transmission system having a stand-by line switching facility, which enables rapid switching from the faulty working line to the stand-by line and also from the stand-by line to a working line restored from the fault.

To achieve the above object, the system of the present invention includes first means and second means.

The first means issues, upon receipt of a line switching command, a single line switching control signal. And a plurality of the second means, disposed for each of the working lines and the stand-by line, commonly receive the single line switching control signal and perform respective line switching between the working line and the stand-by line simultaneously.

BRIEF DESCRIPTION OF THE DRAWINGS

The above object and features of the present invention will be more apparent from the following description of the preferred embodiments with reference to the accompanying drawings, wherein:

FIGS. 1A and 1B are a block diagrams of an arrangement of a conventional transmission system having a stand-by line switching facility;

FIGS. 2A and 2B illustrate principle construction of the transmission system having a stand-by line switching facility according to the present invention;

FIGS. 3A and 3B are block diagrams of an embodiment according to the present invention;

FIG. 7 depicts a bit logic arrangement for explaining the operation achieved in the circuit of FIG. 6;

DESCRIPTION OF THE PREFERRED EMBODIMENTS

Figure 4:
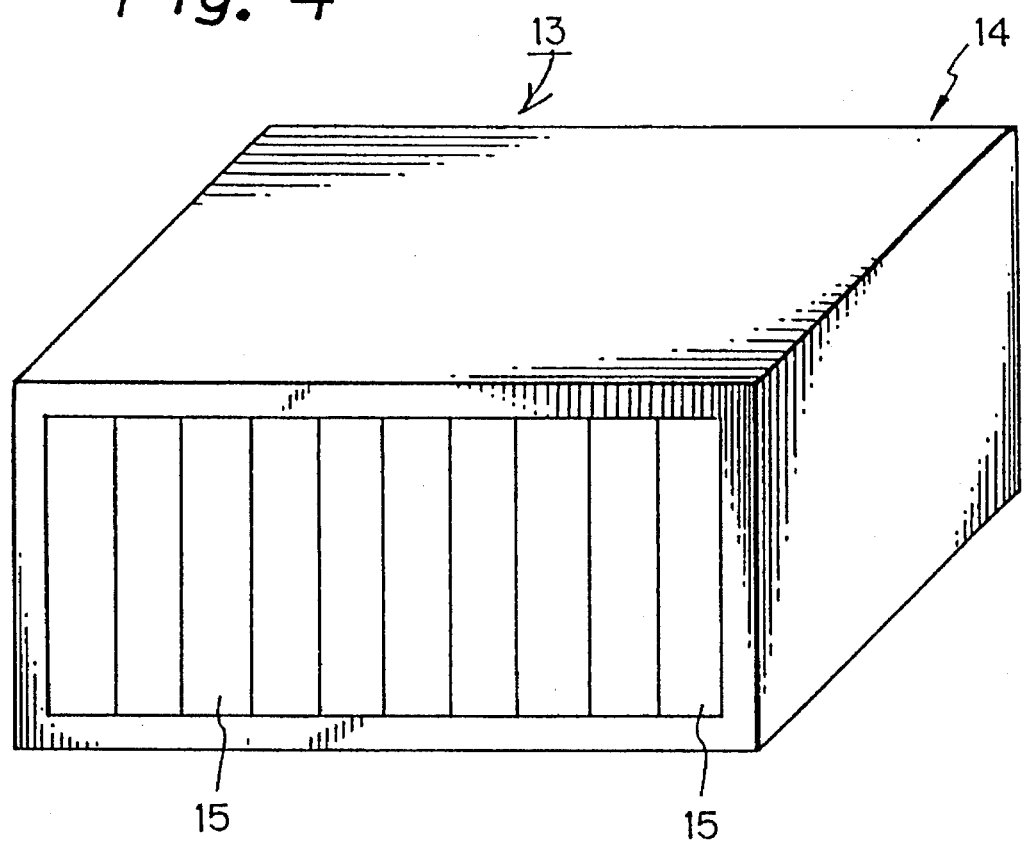
FIG. 4 is a perspective view of a shelf in which the transmission system is constructed.

Before describing the embodiments of the present invention, the prior art and the problems therein will be first described with reference to the related figures.

FIGS. 1A and 1B are block diagrams of an arrangement of a conventional transmission system having a stand-by line switching facility. In FIGS. 1A and 1B, input signals of a lower signal level, such as signals sent from exchanges of telephone offices, are applied to an input exchange unit 1. In the input exchange unit 1, the thus received input signals are multiplexed and exchanged to reach a specified one of working line side processing equipments 2-1, 2-2 - - - 2-n. Each of the working line side processing equipments 2-1, 2-2 - - - 2-n processes at its processing unit 2a, the thus given input signal and applies the same to a processing unit 4 of a higher signal level via its own selector 2b. The processing unit 4 of higher signal level multiplexes the signals from the channels CH1, CH2 - - - CHn and outputs the same.

During the above processing achieved in each of the working line side processing equipments 2-1, 2-2 - - - 2-n, a switching control unit 5 monitors each working line side processing equipment whether or not a fault occurs therein. The fault can be found by an error checking device (not shown) mounted in each of the working line side processing equipments 2-1, 2-2 - - - 2-n. If the fault is found occurring in any one of the equipments 2-1, 2-2 - - - 2-n, the faulty transmission line of the related equipment, e.g., the equipments 2-1, is disconnected, upon receipt of a disconnect signal ("1") issued from the switching control unit 5. Next, the switching control unit 5 issues a connect signal ("2") to a stand-by line processing equipment 3 to replace the faulty transmission line. Thereafter, the faulty working line side processing equipment 2-1 is replaced by the stand-by line side processing equipment 3 until the fault is restored.

The above mentioned automatic line switching is achieved under control of a microprocessor or a central processing unit (CPU) mounted in the switching control unit 5. Thus the automatic line switching can be achieved with the use of software executed by the CPU, which enables a common construction of the circuits, an increase in flexibility in handling a control sequencer, and simplification in maintenance of the equipments.

The above explained prior art automatic switching operation produces the problem mentioned earlier. Namely, as mentioned above, the software of the CPU in the switching control unit 5 provides a command to disconnect the transmission path of the faulty working line side processing equipment 2-1, 2-2 - - - or 2-n. Then, the software provides another command to connect the transmission path of the stand-by side processing equipment 3. Thus, at least two commands must be issued sequentially, which causes an undesired delay in completing the line switching from the faulty working line side transmission path to the stand-by line side transmission path.

FIGS. 2A and 2B illustrate a principle construction of the transmission system having a stand-by line switching facility according to the present invention. In the present invention, a first means 11 and a plurality of second means 12 are introduced.

The first means 11 issues, upon receipt of a line switching command, a single line switching control signal. The line switching command can be given from, e.g., the aforesaid error checking device of the faulty working line side processing equipment. The first means 11 issues, upon receipt of the switching command, not double line switching control signals, i.e., the disconnect signal "1" and the connect signal "2", as in the prior art, but issues a single line switching control signal, e.g., a connect/disconnect signal "3" as shown in FIGS. 2A and 2B.

A plurality of the second means 12 is disposed for each of the working line side processing equipments 2-1, 2-2 - - - 2-n and the stand-by line side processing equipment. Each of the second means 12 receives the single line switching control signal "3" and performs the line switching operation from the faulty working line to the stand-by line or from the stand-by line and the working line restored from the fault.

Thus, the line switching operation at the working line side and the line switching operation at the standby line side are achieved simultaneously. This can shorten the aforesaid delay time in completing the line switching, since the two line switching operations can be done at one time.

FIGS. 3A and 3B are block diagram of an embodiment according to the present invention. Each of the second means 12 (FIGS. 2A and 2B) is comprised of a switching control signal receiving unit 22 which receives the switching control signal issued from the first means 11 (FIG. 2A) and selects, at the selector unit 2b, one of output ports 7 through which the information signal is transmitted.

The first means 11 (FIG. 2A) is comprised of a central processing unit (CPU) part 21 which is operative to issue the aforesaid single line switching control signal "3" and a chip selection signal, upon receipt of the line switching command given from one of the working line side processing equipments 2-1, 2-2 - - - 2-n. The chip selection signal will be explained hereinafter.

Figure 5:
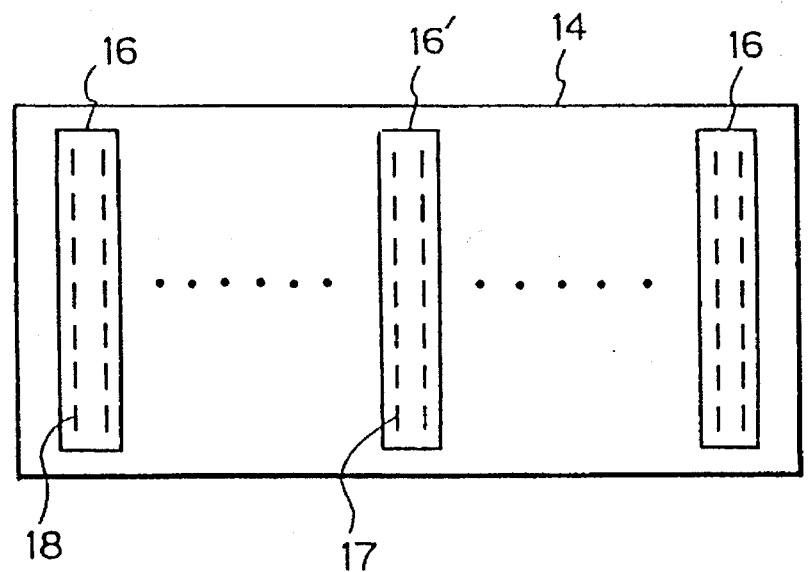
FIG. 5 is a plan view showing a back board of the shelf.

FIG. 4 is a perspective view of a shelf in which the transmission system is constructed and FIG. 5 a plan view showing a back board of the shelf.

The working line side processing equipments 2-1, 2-2 - - - 2-n and the stand-by side processing equipment 3 have substantially the same construction as each other. However, working/stand-by discrimination signals (W/S) are given to the working line side processing equipments 2-1, 2-2 - - - 2-n and the stand-by side processing equipment 3 separately and the chip selection signals (CS) are given to the working line side processing equipments 2-1, 2-2 - - - 2-n independently, the chip selection signals being used for specifying respective working line side processing equipments. The above signals are distributed on a back board 14 (FIG. 5) of a shelf 13 (FIG. 4).

As mentioned above, the equipments 2-1, 2-2 - - - 2-n and 3 have a common construction, and therefore, it is possible to reduce a manufacturing cost of each equipment and simplify maintenance.

As seen from FIG. 4, the working line side processing equipment 2-1, 2-2 - - - 2-n and the stand-by line side processing equipment 3 are constructed as packages 15. The packages 15 are inserted into respective predetermined slots formed in parallel inside the shelf 13. The packages 15 are electrically connectable to respective connectors 16 mounted on the back board 14 of the shelf 13. The connector 16' corresponding to the stand-by line side processing equipment 3 has a pin 17 providing a first voltage as the working/stand-by discrimination signal, while the connectors 16 corresponding to the working line side processing equipments 2-1, 2-2 - - - 2-n have pins 18 providing a second voltage as the working/stand-by discrimination signals which will be explained in detail hereinafter. Note that only three connectors are illustrated in FIG. 5 for simplicity.

Figure 6:
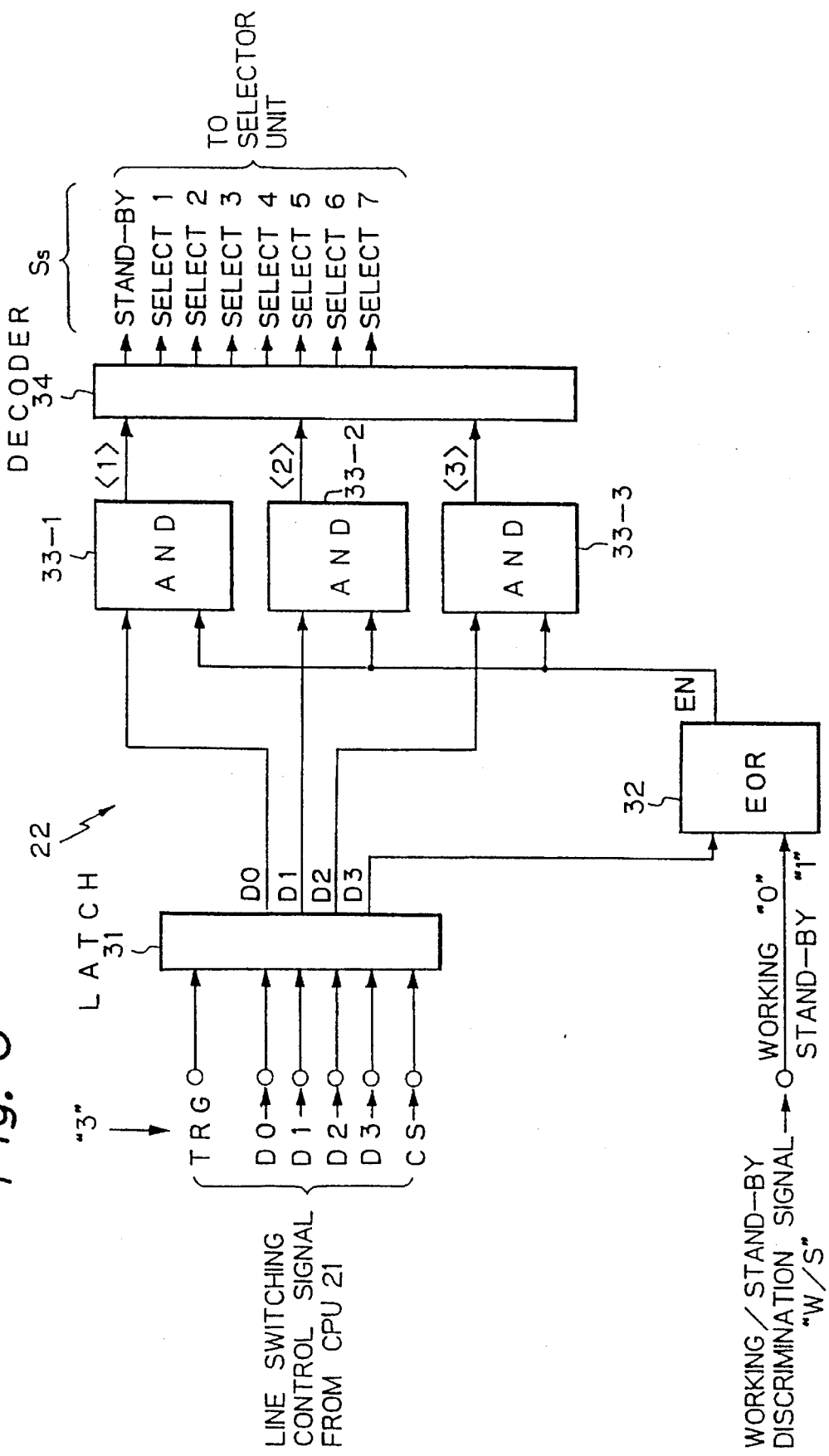
FIG. 6 illustrates an example of the switching control signal receiving unit shown in FIGS. 3A and 3B.

FIG. 6 illustrates an example of the switching control signal receiving unit shown in FIG. 3A and 3B. Each of the switching control signal receiving units 22 has a latch circuit 31 which receives the line switching control signal (CONNECT/DISCONNECT SIGNAL) "3" and holds it therein. The latch circuit 31 in the faulty working line side processing equipment, e.g., 2-1 and the standby line side processing equipment 3 are selectively enabled by the chip selection signals CS in accordance with the line switching command.

Each of the switching control signal receiving units 22 has a first logic gate (32) which is operative to convert the single line switching control signal "3" output from the latch circuit 31 either to the working line side switching control signal or to the stand-by line side switching central signal. In the example, the first logic gate is constituted by an Exclusive OR gate (EOR) 32.

Further, each of the switching control signal receiving units 22 has second logic gates (33) which receive, at their first inputs, the outputs from the latch circuit 31 bit by bit, and at their second inputs, receive the output from the first logic gate (32) commonly. In the example, the second logic gates are constituted by AND gates 33-1, 33-2 and 33-3.

Furthermore, each of the switching control signal receiving units 22 has a decoder 34 to produce selecting signals ($S_s$) for specifying, in the selector unit 2b (FIG. 3), one of the output ports 7.

To be more specific, the line switching control signal contains four control bits D0, D1, D2 and D3. The control bit (MSB) D3 and the working/stand-by discrimination signal W/S are applied to the EOR gate 32. The signal W/S for each working line side processing equipment (2-1 to 2-n) assumes logic "0" by the connection with the pin 18 (FIG. 5) providing 0 V as said second voltage, while the signal W/S for the stand-by line side processing equipment 3 assumes logic "1" by the connection with the pin 17 (FIG. 5) providing +5 V as the first voltage.

The control bit D3 and the signal W/S are exclusive ORed at the gate (EOR) 32. The resultant data EN (enable) from the gate (EOR) 32 and the remaining control bits D0 to D2 are applied to the gate (AND) 33-1 to 33-3 bit by bit.

The resultant data are applied to the decoder 34 to produce the selecting signal $S_s$ which specifies, in the selector unit 2b, which one of the output ports 7 (FIGS. 3A and 3B) is to be selected.

FIG. 7 depicts a bit logic arrangement for explaining the operation achieved in the circuit of FIG. 6. Assuming here that there are seven working line side processing equipments, i.e., the equipments 2-1 to 2-7, as an example, if the number of the working line side processing equipments is higher or lower than 7 (n=7), the number of the control bits (D0, D1 - - - ) is decreased or increased. Note that reference characters D3 to D0, W/S, EN, <3> to <1> and $S_s$ are the same as those shown in FIG. 6, where <3> to <1> represent the outputs from the AND gates 33-1 to 33-3, respectively.

Suppose that some fault occurs in the working line side processing equipment 2-1, the CPU 21 sends the control bits D3 to D0 which are "0001" as shown in the left column of FIG. 7. This control bit D3 of "0" and the working/stand-by discrimination signal W/S are applied to the EOR gate 32. In this example, the CPU 21 also sends the chip selection signal CS which indicates the faulty equipment 2-1 (refer to CS-SYS1 in FIG. 8). Also, the CPU 21 sends the chip selection signal CS which indicates the stand-by (STBY) line side equipment 3 which is to replace the faulty equipment 2-1 (refer to CS-SYSSTBY in FIG. 8). The middle column of FIG. 7 depicts the bit arrangement for the stand-by line side processing equipment 3 and the right column of FIG. 7 depicts the bit arrangement for the faulty working line side processing equipment 2-1.

Referring to both FIGS. 6 and 7, in the stand-by line side processing equipment 3, the aforesaid control bit D3 of logic "0" and the signal W/S of logic "1" are applied to the EOR gate 32 to produce the signal EN of logic "1". Thus, the three AND gates 33-1 to 33-3 are all opened and the control bits D0, D1 and D2 pass therethrough as the outputs <1>, <2> and <3> which are "100". The decoder 34 receives the outputs "100" to produce the corresponding selecting signal $S_s$ which indicates that the output port 7 for the channel 1 (CH1), i.e., the equipment 2-1, is to be selected at the selector unit 2b.

On the other hand, in the faulty working line side processing equipment 2-1, the aforesaid control bit D3 of logic "0" and the signal W/S of logic "0" are applied to the EOR gate 32 to produce the signal EN of logic "0". Thus, the three AND gates 33-1 to 33-3 are all closed and the control bits D0, D1 and D2 are inhibited from passing therethrough, whereby the outputs <1>, <2> and <3> become "000". The decoder 34 receives the outputs "000" to produce the corresponding selecting signal $S_s$ which indicates that the output port 7 for the stand-by is to be selected at the selector unit 2b. In actuality, this output port for the stand-by is not connected.

The above explanation is also true for the remaining sets of the control bits D3 to D0 in selecting the output ports for the equipments 2-2 to 2-7 and 3 by the selecting signals $S_s$ "SELECT 2" to "SELECT 7" and "STAND-BY".

Figure 8:
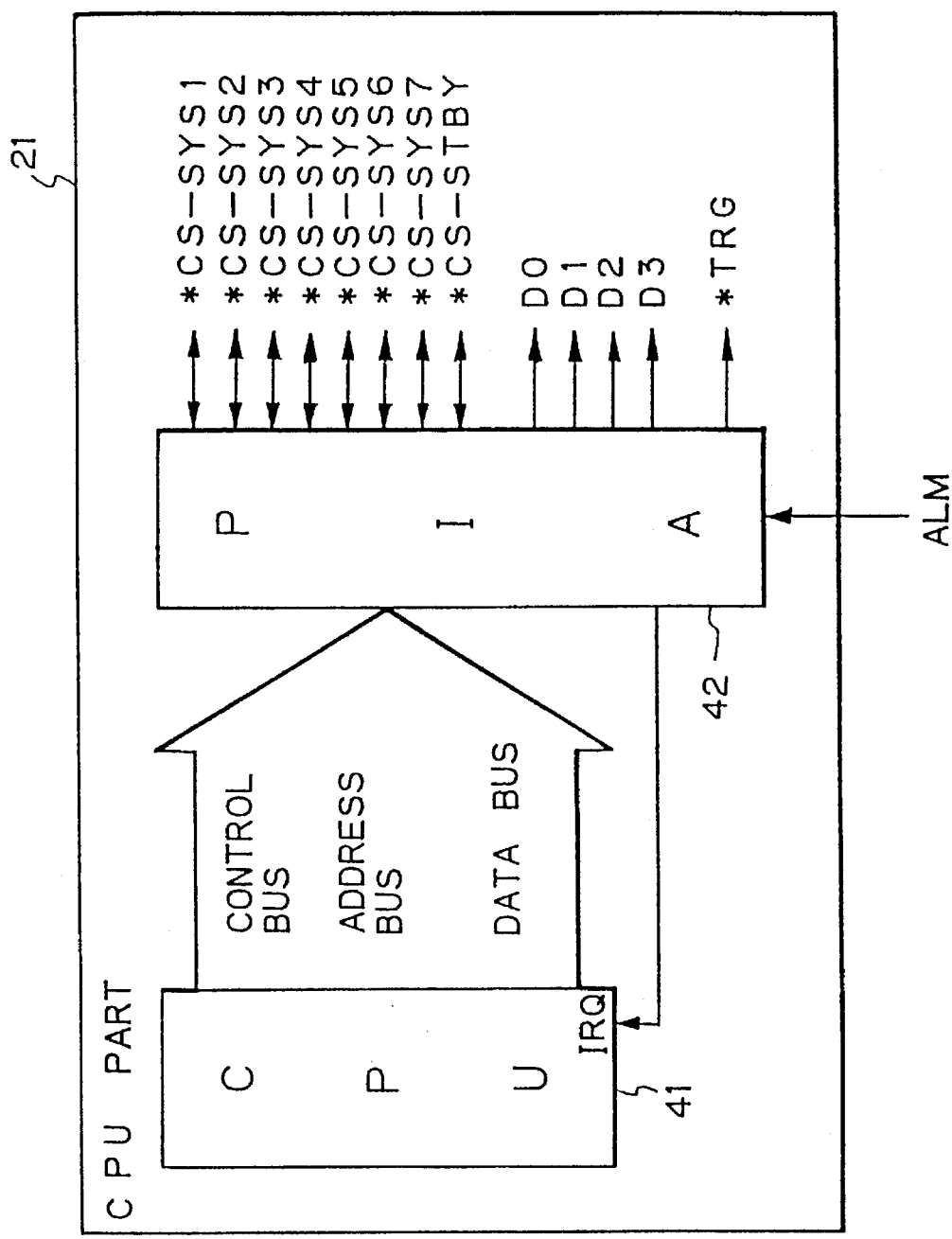
FIG. 8 is a block diagram of the CPU part 21 of FIG. 3.

FIG. 8 is a block diagram of the CPU part 21 of FIG. 3A. The central processing unit (CPU) 41 cooperates with a peripheral interface adaptor (PIA) 42 connected thereto via buses, through which peripheral interface adaptor 42 the single switching control signal (D0 to D3), the chip selection signals (CS) and a trigger signal (TRG) which is given to each of the latch circuits to determine a timing when both the single switching control signal and the chip selection signals are to be read, are passed.

To be specific, the CPU part 21 contains the CPU 41 and the PIA 42. The CPU 41 produces a variety of signals such as the signals CS-SYS1 to CS-SYS7 and CS-STBY, D0 to D3 and TRG. The PIA 42 prevents a malfunction from occurring when the CPU 41 goes out of control. Since the PIA 42, in general, cannot become effective until a plurality of sets of instructions are all given from the CPU 41, the PIA 42 is very tolerant of noise.

When an alarm signal ALM, i.e., the aforesaid line switching command, is given to the PIA 42, the PIA 42 immediately sends an interrupt signal IRQ to the CPU 41 to bring both the faulty working line side processing equipment (2) and the stand-by line side processing equipment 3 into a switching state.

Figure 9:
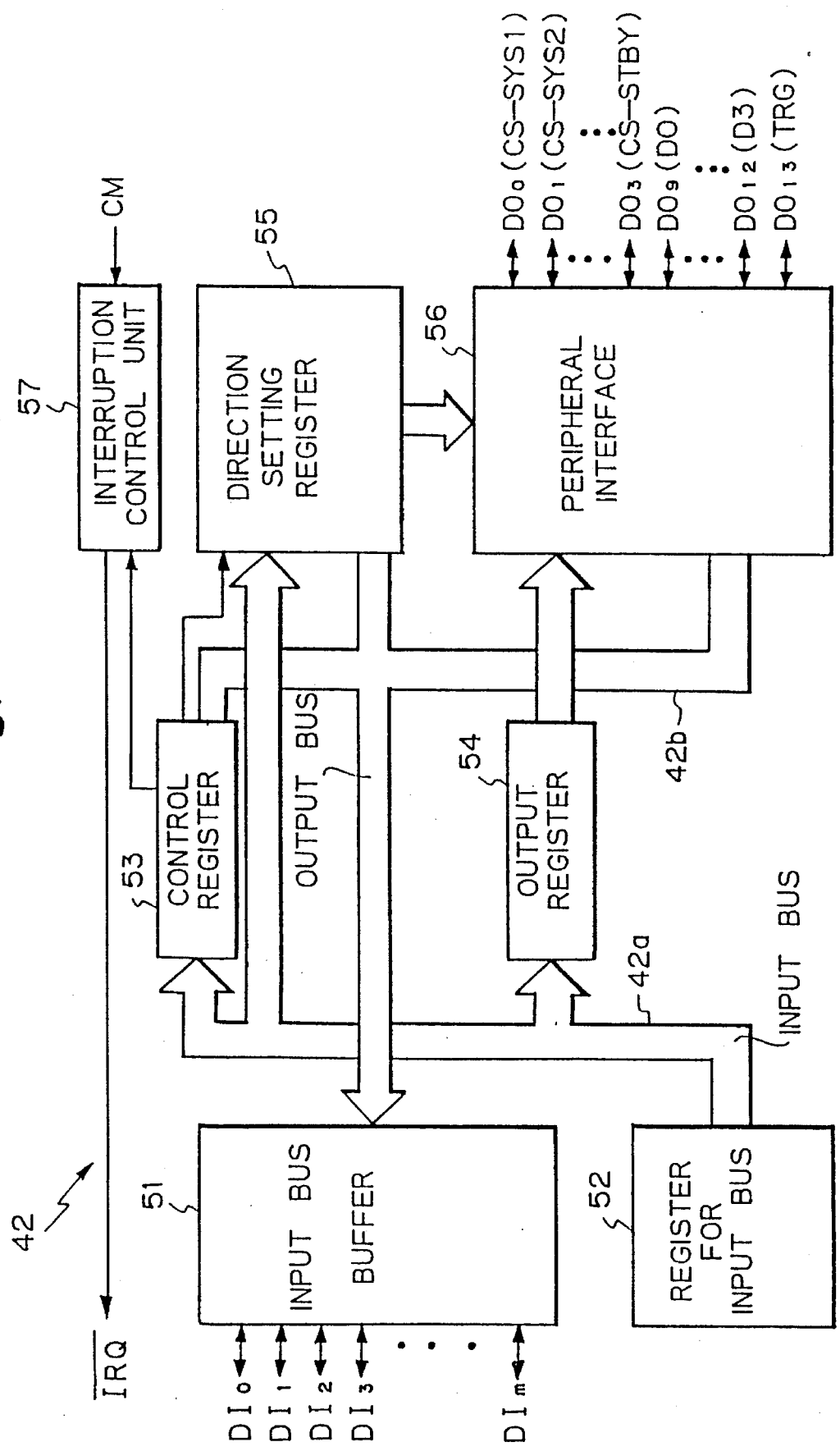
FIG. 9 illustrates a detailed construction of the PIA 42 of FIG. 8.

FIG. 9 illustrates a detailed construction of the PIA 42 of FIG. 8. The construction of FIG. 9 is common in this field. The function of each block is briefly as follows. An input bus buffer 51 holds the input signals $DI_0$ to $DI_3$ supplied from the CPU 41. A register for input bus buffer 52 has applied thereto a control signal from the CPU 41, which control signal is used for operating a control register 53 and an output register 54. The control register 53 determines which bus is to be used. The output register 54 holds therein the line switching signal and so on. A direction setting register 55 has applied thereto the control signal from the control register 53 to determine that each signal, such as $DO_0$ to $DO_{13}$, is to be input to the CPU 41 or output from the CPU 41. A peripheral interface 56 is used as an interface between the PIA 42 and each of the line switching control signal receivers 12 (see FIGS. 2A and 2B). An interrupt control unit 57 receives the line switching command CM from the faulty equipment (2) and produces the interrupt signal IRQ.

Figure 10:
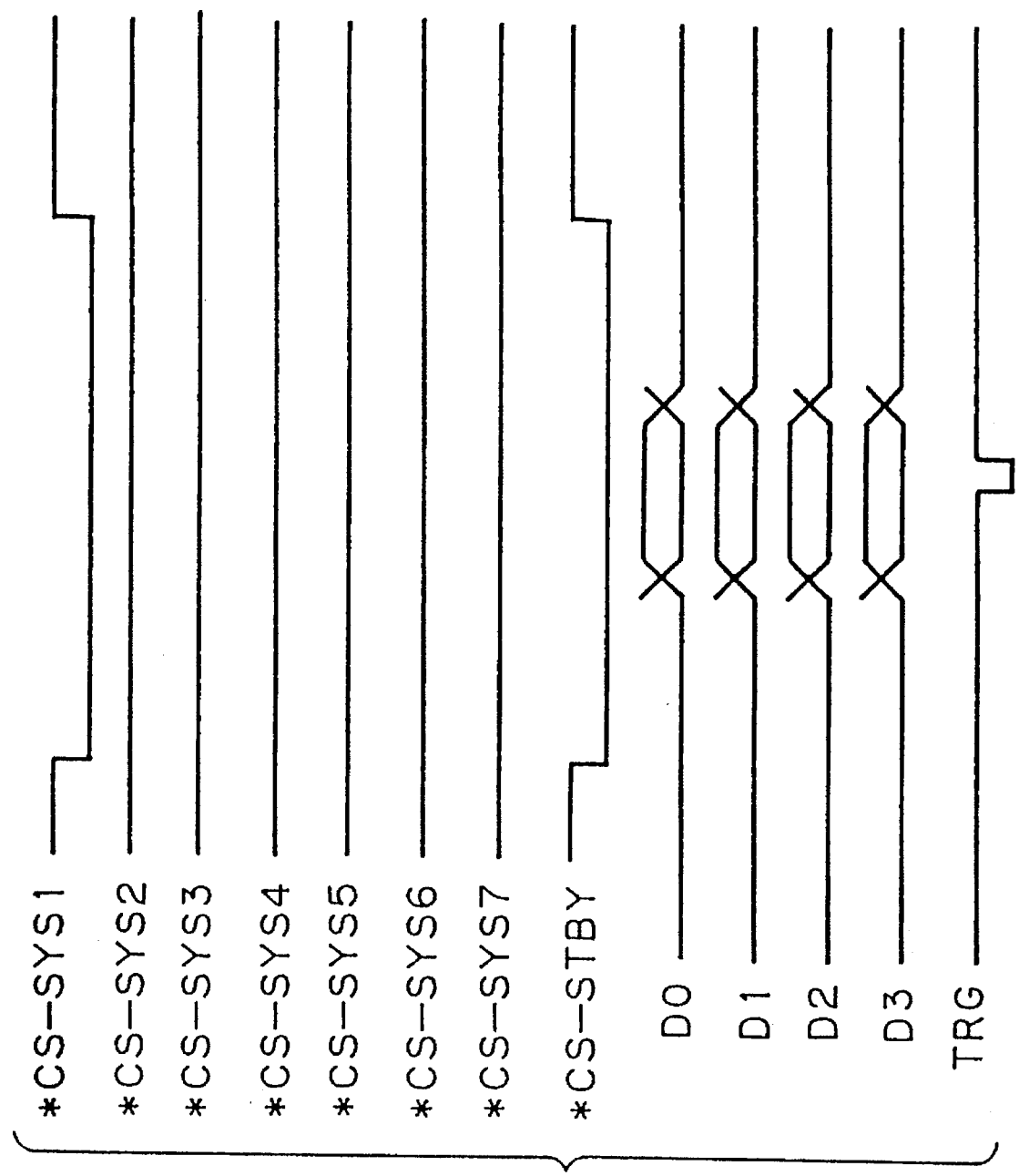
FIG. 10 depicts timing charts of the signals output from the CPU 41 of FIG. 8.

FIG. 10 depicts timing charts of the signals output from the CPU 41 of FIG. 8. The timing charts correspond to a case, as an example, where the faulty working line side processing equipment 2-1 is to be replaced by the stand-by line side processing equipment 3. Accordingly, the signals CS-SYS1 and CS-STBY change in level. During the level changes of the signals CS-SYS1 and CS-STBY, the control bits D0 to D3 are also output from the CPU 41. The trigger signal TRG determines a timing when all the signals (CS-SYS1, CS-STBY, D0 to D3) becomes effectively available.

Figure 11:
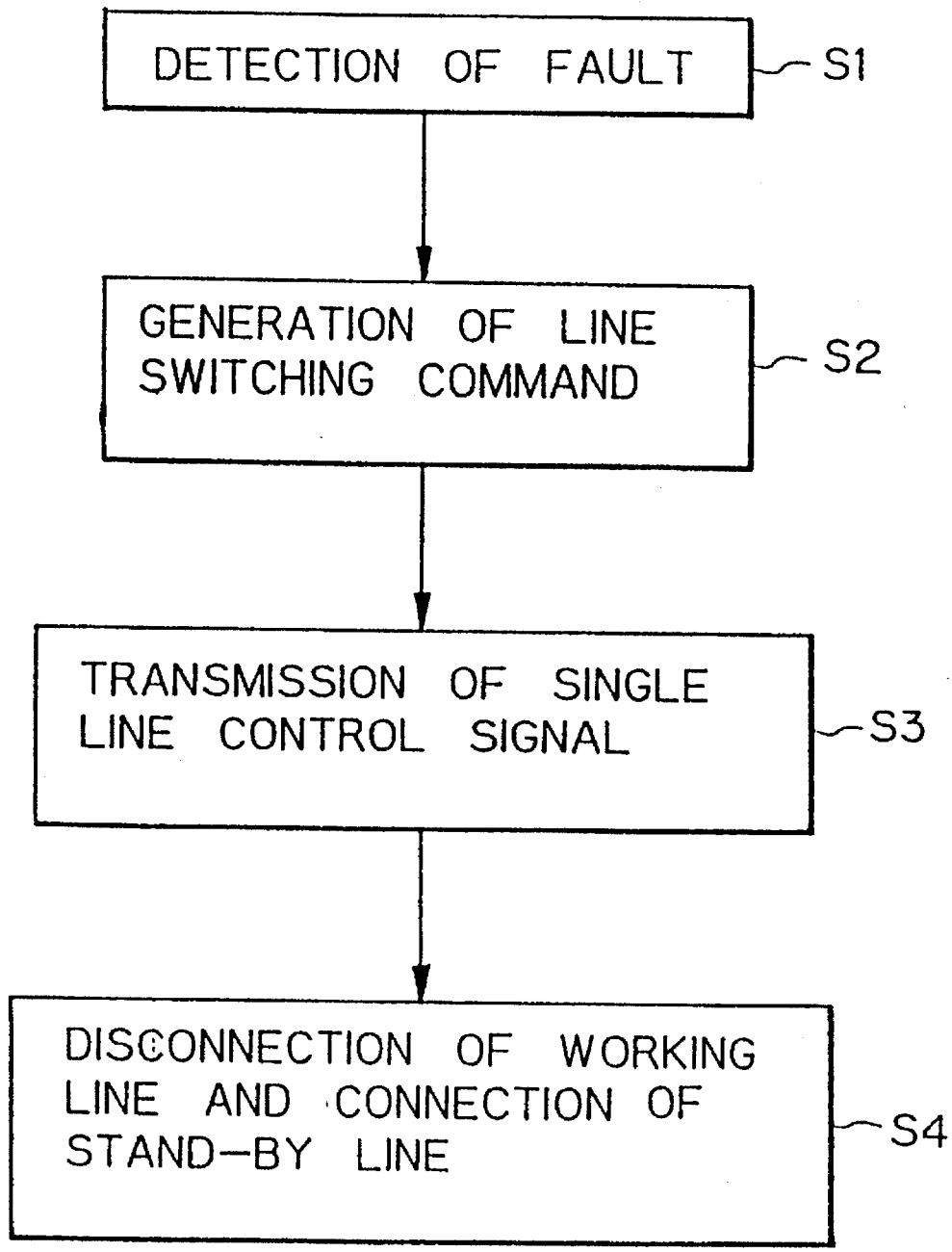
FIG. 11 depicts a flowchart for carrying out a method of the present invention when a fault occurs.

FIG. 11 depicts a flowchart for carrying out a method of the present invention when a fault occurs. The above mentioned transmission system is operated, in general, by the following steps.

At step S1, a fault occurring in one of the working line side processing equipment is detected.

At step S2, a line switching command in the faulty working line side processing equipment is generated and sent to the line switching control unit.

At step S3, a single line switching control signal is transmitted, upon receipt of the line switching command, to the working line side and stand-by line side processing equipments, simultaneously.

At step S4, the faulty working line is disconnected and the stand-by line is connected simultaneously to replace the faulty working line.

Figure 12:
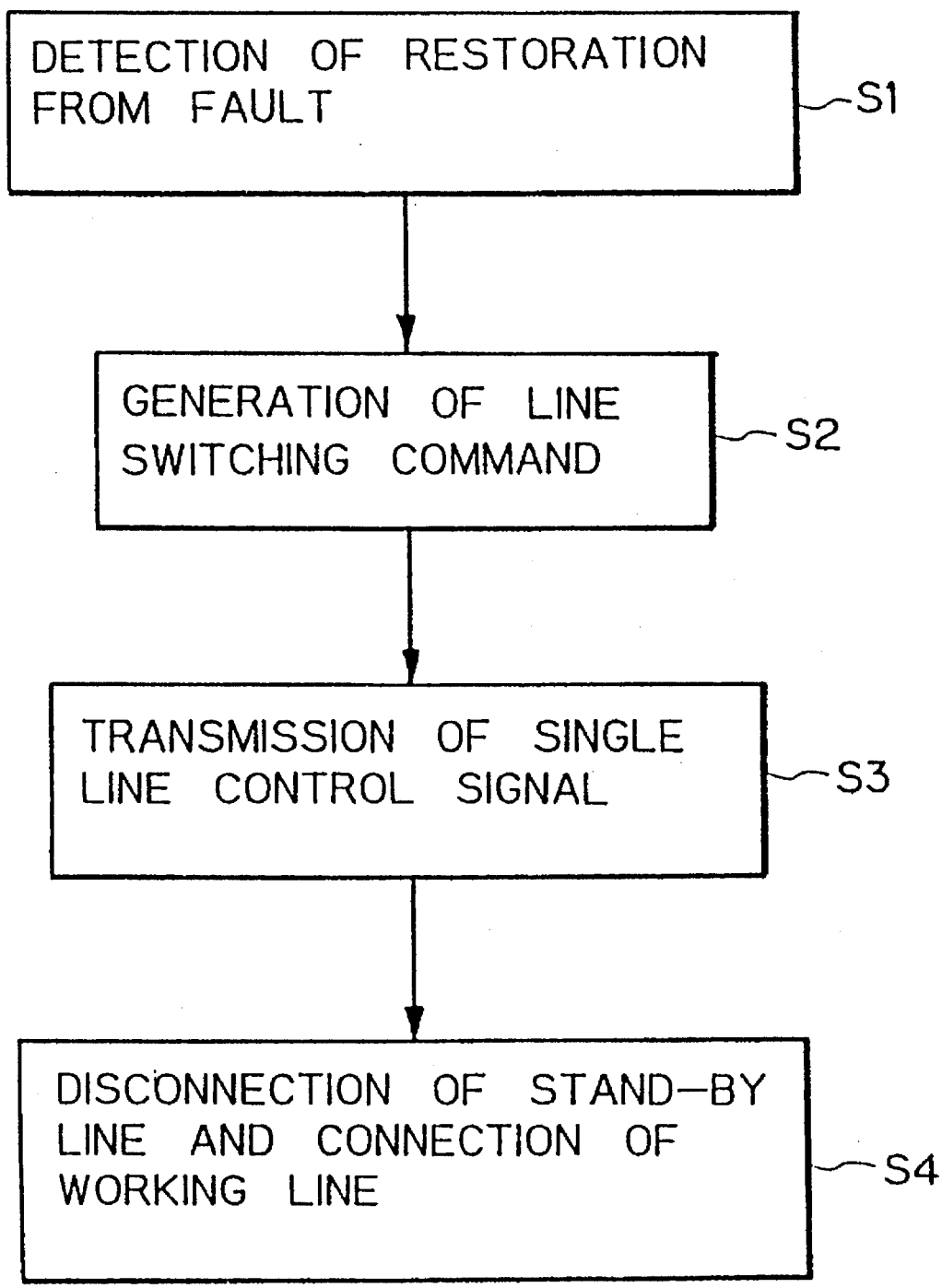
FIG. 12 depicts a flowchart for carrying out a method of the present invention when restoration from a fault has occurred.

FIG. 12 depicts a flowchart for carrying out a method of the present invention when restoration from a fault has occurred.

At step S1, a restoration from a fault that occurred in one of the working line side processing equipments is detected.

At step S2, a line switching command in the restored working line side processing equipment is generated and sent to the line switching control unit.

At step S3, a single line switching control signal is transmitted, upon receipt of the line switching command, to the working line side and stand-by line side processing equipments, simultaneously.

At step S4, the restored working line is connected and the stand-by line is disconnected simultaneously to restore these lines as before.

The above method of FIG. 12 will further be explained with reference to FIGS. 6 and 7. In the case of FIG. 12, at step S2, the control bits of "1001" are given from the CPU 21, if the equipment 2-1 has been faulty, as the bits (D0, D1, D2, D3). The working/standby discrimination signal W/S for the working line side processing equipments 2-1 to 2-7 is logic "0", and therefore, the Exclusive OR gate (EOR) 32 receives both the bit D3 of logic "1" and the signal W/S of logic "0" to produce logic "1" therefrom as the output EN. Thus, the outputs <1>, <2> and <3> from the respective AND gates 33-1, 33-2 and 33-3 assume "100". At this time, the decoder 34 produces the selecting signal $S_s$ for specifying the working line side equipment 2-1.

On the other hand, the W/S signal for the stand-by line side equipment 3 is logic "1", and the EOR gate 32 receives the bit D3 of logic "1" and the signal W/S of logic "1". Thus the EN of logic "0" is applied to the AND gates 33-1, 33-2 and 33-3 to close the same. In this case, the decoder 34 produces the selecting signal $S_s$ indicating that the stand-by line side equipment 3 is to be selected.

At this time, the simultaneous connection and disconnection for the working line side equipment and the stand-by line side equipment are performed.

Although the above explanation has been directed to a case where a transmission system having a plurality of working line side equipments 2-1 to 2-n, it is, of course, possible to apply the present invention to a transmission system having a single working line side equipment 2 and the stand-by line side equipment 3.

As mentioned above in detail, according to the present invention, a rapid line switching can be ensured, i.e., there is no delay at the line switching from the working line side to the stand-by line and vice versa.

The transmission system of the present invention can flexibly be applied to various numbers of the working line side processing equipments, merely by increasing or decreasing the number of the control bits D0, D2, - - - .

The line switching facility from the faulty working line side to the stand-by line side can be identical to the line switching facility for restoration from a fault. This enables unified operation and hardware in both cases.

The line switching of the present invention can be performed with high reliability, since the PIA 42 is employed.

We claim:

1. A transmission system having a stand-by line switching facility, the transmission system including a plurality of working lines for transferring respective information signals, a stand-by line for replacing a faulty working line, and a stand-by line switching apparatus for carrying out switching between the faulty working line and the stand-by line, comprising:

first means for issuing, upon receipt of a line switching command, a single line switching control signal; and a plurality of second means, disposed for each of said working lines and for said stand-by line, for commonly receiving said single line switching control signal and performing respective line switching between the faulty working line and the stand-by line simultaneously, each of said second means including a switching control signal receiving unit for receiving said single line switching control signal issued from said first means and for selecting, at a selector unit, one of output ports through which one of said information signals is transmitted, said plurality of second means being mounted in respective working line side processing equipments and in a stand-by line side processing equipment, each of the working line side processing equipments outputting said line switching command when it is detected that a fault occurs therein and when restoration from the fault is confirmed, said working line side processing equipments and said stand-by side processing equipment having substantially the same construction as each other, working/stand-by discrimination signals being given to the working line side processing equipments and to said stand-by side processing equipment separately, and chip selection signals being given to the working line side processing equipments independently, said chip selection signals being used for specifying respective working line side processing equipments.

2. A transmission system having a stand-by line switching facility as set forth in claim 1, wherein said working line side processing equipments and the stand-by line side processing equipment are constructed as packages and the packages are inserted into respective predetermined slots formed in parallel inside a shelf, the packages are electrically connectable to respective connectors mounted on a back board of the shelf, the connector corresponding to the stand-by line side processing equipment has a pin providing a first voltage as said working/stand-by discrimination signal, the connectors corresponding to the working line side processing equipments have pins providing a second voltage as said working/stand-by discrimination signals.

3. A transmission system having a stand-by line switching facility as set forth in claim 1, wherein each of said switching control signal receiving units has a latch circuit which receives said line switching control signal and holds it therein, the latch circuit in the faulty working line side processing equipment and the stand-by line side processing equipment are selectively enabled by said chip selection signals in accordance with said line switching command.

4. A transmission system having a stand-by line switching facility as set forth in claim 3, wherein each of said switching control signal receiving units has a first logic gate which is operative to convert said single line switching control signal output from said latch circuit either to the working line side switching control signal or to the stand-by line side switching control signal.

5. A transmission system having a stand-by line switching facility as set forth in claim 4, wherein said first logic gate is constituted by an Exclusive OR gate.

6. A transmission system having a stand-by line switching facility as set forth in claim 4, wherein each of said switching control signal receiving units has second logic gates which receive, at their first inputs, the outputs from said latch circuit bit by bit, and at their second inputs, the output from said first logic gate commonly.

7. A transmission system having a stand-by line switching facility as set forth in claim 6, wherein said second logic gates are constituted by AND gates.

8. A transmission system having a stand-by line switching facility as set forth in claim 6, wherein each of said switching control signal receiving units has a decoder to produce selection signals for specifying, in said selector unit, one of said output ports.

9. A transmission system having a stand-by line switching facility as set forth in claim 3, wherein said first means is comprised of a central processing unit part which is operative to issue said single line switching control signal and said chip selection signal, upon receipt of said line switching command given from one of said working line side processing equipments.

10. A transmission system having a stand-by line switching facility as set forth in claim 9, wherein a central processing unit of said central processing unit part cooperates with a peripheral interface adaptor connected thereto via buses, through which peripheral interface adaptor said single switching control signal, said chip selection signals and a trigger signal which is given to each of said latch circuits to determine a timing when both the single switching control signal and the chip selection signals are to be read, are passed.

* * * * *